A. N. SIMMERLY.
VEHICLE WHEEL.
APPLICATION FILED AUG. 5, 1910.

1,068,826.

Patented July 29, 1913.
2 SHEETS—SHEET 1.

Witnesses
Edwin F. McKee
James A. Koehl

Inventor
Albert N. Simmerly
By Victor J. Evans
Attorney

A. N. SIMMERLY.
VEHICLE WHEEL.
APPLICATION FILED AUG. 5, 1910.

1,068,826.

Patented July 29, 1913.

2 SHEETS—SHEET 2.

Witnesses
Edwin G. McKee
James A. Koehl

Inventor
Albert N. Simmerly
By Victor J. Evans
Attorney

UNITED STATES PATENT OFFICE.

ALBERT N. SIMMERLY, OF CLEVELAND, OHIO.

VEHICLE-WHEEL.

1,068,826.  Specification of Letters Patent.  Patented July 29, 1913.

Application filed August 5, 1910. Serial No. 575,655.

*To all whom it may concern:*

Be it known that I, ALBERT N. SIMMERLY, a citizen of the United States of America, residing at Cleveland, in the county of Cuyahoga and State of Ohio, have invented new and useful Improvements in Vehicle-Wheels, of which the following is a specification.

This invention relates to vehicle wheels, and particularly to one of a type employing spring means as a substitute for the usual and well known forms of pneumatic tires, the object of the invention being to provide a simple wheel of this design that can be manufactured at a comparatively low cost.

Figure 1:
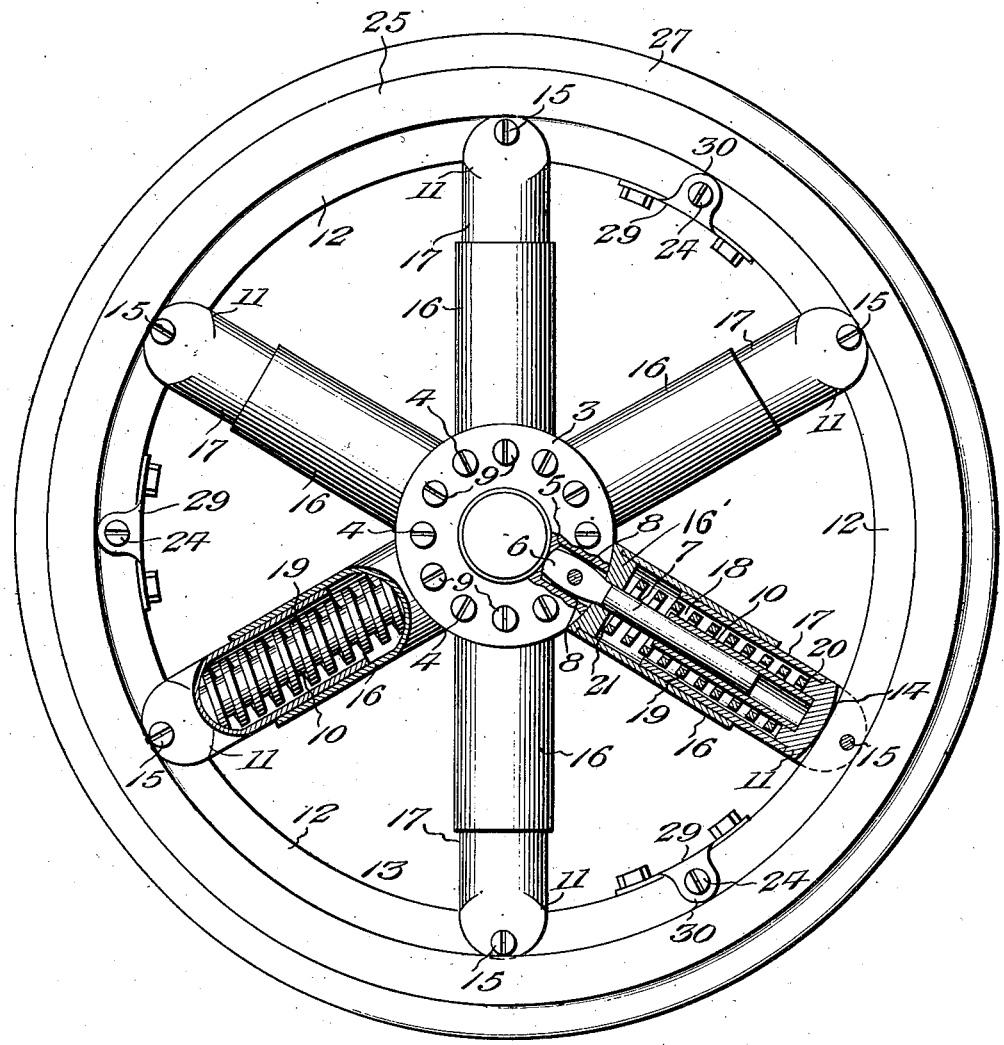
Figure 2:
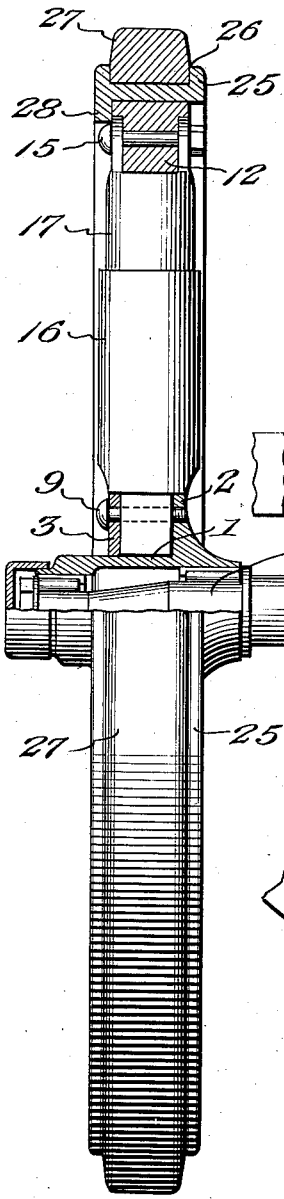
Figure 3:
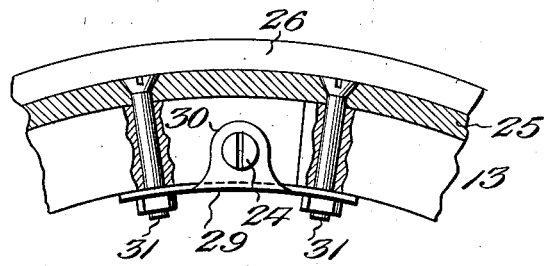
Figure 4:
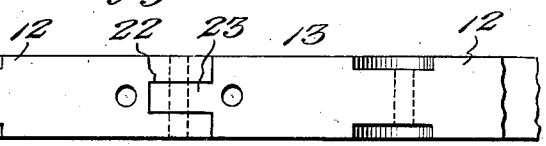
Figure 5:
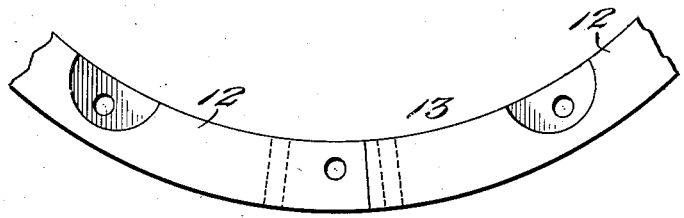

In the drawings, forming a portion of this specification and in which like numerals of reference indicate similar parts in the several views:—Figure 1 is a side elevation of my improved wheel, parts being shown in section. Fig. 2 is an edge view thereof, partly in section. Fig. 3 is a detail side elevation of a portion of the rim of the wheel showing the manner of connecting the same with the tire-supporting rim. Fig. 4 is a detail edge view of the rim sections. Fig. 5 is a side elevation thereof.

My improved wheel consists preferably of a hub 1 which is provided with the fixed plate 2 and the removable plate 3. The plates are secured together by bolts or similar equivalent fastening devices 4. The plate 3 is formed to provide radial recesses 5 in which the head portions 6 of the spoke sections 7 are mounted. The head of each spoke is provided with curved side faces 8 to engage the walls of the recesses in pivotal movements of the spokes so that considerable strain is removed from the pivots 9. Each pivot 9 for the spokes is preferably of bolt-form and it is operatively associated with the plates 2 and 3 so as to permit removal of the spokes when desired. The spoke sections 10 telescope the sections 7 and as shown, they are formed at their outer ends to provide heads 11 which are forked and whose arms straddle the sections 12 of the rim 13. The heads 11 are provided with curved surfaces 14 which are arranged in opposite relation with the said rim so as to permit the required pivotal movements of the spokes. Pivoted pins 15 extend through the arms of the forked portions of the heads 11 and through the rim.

The section 7 of each spoke is provided with a tube-like housing 16 which telescopes the tube-like housing 17 of the section 10, and are formed at their inner ends to provide heads 16' which are slidably mounted on the spokes 7. The housing 17 of the section 10 is formed to provide a space 18 through which the spring 19 extends. The spring for each spoke is of rectangular construction in cross section and as illustrated, one end of the spring bears against the shoulder 20 of the head 11 and at the opposite end against the shoulder 21 at the inner end of the housing 16. From this construction of spoke it will be readily understood that the spring thereof is housed in an effective manner to be guarded against sand, dust or other foreign matter. The springs are of the extensile type and they exert their energy to hold the spoke sections normally extended.

The sections 12 of the rim are formed at their ends to provide sockets and tongues 22 and 23 respectively, and as illustrated, the adjacent sections are connected with each other by bolts 24. A metal rim 25 surrounds the rim 13 and as illustrated, it is formed with a tire-channel 26 in which the cushion tire 27 is fitted. At one side the rim 25 is formed with a flange 28 which extends downwardly onto one side of the rim. At the joints of the rim sections 12 and secured thereto and to the rim 25 are retaining plates 29 having ears 30 which extend against the sides of the rim and which receive the bolts 24 of the rim sections. From this construction it will be seen that the rim 25 is effectively held to the rim 13 and through provision of the retaining bolts 31 they may be conveniently adjusted when it is desired to remove the rim 25 from the rim 13.

A vehicle wheel as described in the foregoing will be found most desirable in view of its simplicity and particularly in view of the fact that it is absolutely puncture-proof and cannot become easily destroyed or mutilated. The cushioning action of the wheel, incident to the provision of the springs, is a substantial equivalent of the pneumatic tires now in general use. The tire 27 when worn may be conveniently removed and replaced by a new one at a minimum cost. The hub 1 may be of any suitable well known construction which will permit of its engagement with the spindle 32.

I claim:—

In a wheel of the class described, the combination of a hub having recesses formed therein, said recesses having spaced parallel side walls, a rim, telescopic spoke sections radiating from said hub, the inner section of said spokes being provided with a flattened inner end portion centrally pivoted within said recesses, said flattened end portions being formed to provide oppositely curved side faces adapted to normally engage the side walls of said recesses midway between its ends to limit the movement of said spokes, springs surrounding said spokes and operating to hold the spokes extended, housing elements surrounding said spokes, one of said housing elements being slidably mounted thereon, and the outer section of said spokes being rigidly secured to the other of said housing elements and pivotally connected to said rim as described.

In testimony whereof I affix my signature in presence of two witnesses.

ALBERT N. SIMMERLY.

Witnesses:
W. P. FAULHABER,
JOHN F. ZIMMER.